Patented Jan. 22, 1952

2,583,048

UNITED STATES PATENT OFFICE 2,583,048

TETRANITROPROPANE

John A. Hannum and Morris Frumin, Detroit, Mich., assignors, by mesne assignments, to Borg-Warner Corporation, Chicago, Ill., a corporation of Illinois No Drawing. Application February 13, 1946, Serial No. 647,433

3 Claims. (Cl. 260—644)

This invention relates to a new chemical compound with the characteristics of a fuel, as distinguished from a brisant explosive, and to a method by which it may be made. In particular the invention relates to tetranitropropane and a method for its manufacture.

In burning fuels to produce heat that is to be employed to a useful purpose it is necessary to provide oxygen to enable combustion of the fuel to proceed. It has, of course, long been known to carry on such combustion in the open air and use the oxygen present in the atmosphere for this purpose. Also it is known to provide a mixture of fuel and oxygen in some combined form to produce what is called a self-sufficient fuel; i. e., a fuel that combines within itself not only the fuel but also the oxygen required for its combustion. In such a mixture there may not be supplied sufficient oxygen with the fuel and it may be necessary to take part of the required oxygen from the surrounding atmosphere.

Although self-sufficient fuels, as distinguished from explosives, made up of a mixture of fuel and oxidizing agent are of great utility, it would be desirable in certain cases to combine in a single compound, as distinguished from a mixture, the requisite fuel together with the oxygen necessary for its combustion. Thus the fuel, such as carbon or hydrogen, would be in a chemical combination with the oxygen and combustion of the fuel would result in the formation of such compounds as water and carbon dioxide from the original single compound without the addition of more oxygen.

Also it would be desirable, for maximum economy of both fuel and oxygen, to combine in such a composition of the fuel and oxygen in stoichiometric proportions so that at the end of combustion there would be no residue of either.

We have determined that the compound tetranitropropane will meet these requirements. Also we have devised a procedure for synthesizing tetranitropropane, which to the best of our knowledge was never known until this invention.

The general object of the invention is to produce as a single chemical compound a self-sufficient fuel that may be ignited and that will burn without the addition to it of either oxygen or fuel. Another object of the present invention is to produce as a single chemical compound a self-sufficient fuel that combines within itself a stoichiometric mixture of oxygen and combustible to be burned and to give off energy with no residue of either oxygen or combustible uncombined in products of combustion at the end of the complete burning. A further object of the invention is to provide a method for synthesizing such a composition and specifically tetranitropropane. An additional object of the invention is to provide a single compound that may be ignited and that will burn as a fuel, as distinguished from a brisant explosive, to give off energy without the addition to the reaction of any other material and specifically without the addition of oxygen. Another object of the invention is to produce as a new compound tetranitropropane.

Tetranitropropane is a compound that has sufficient oxygen to burn completely the hydrogen and carbon present in it to water and carbon dioxide without an excess of any of these three elements at the end of the burning. This compound may be represented by the formula $C_3H_4(NO_2)_4$. When it is burned, the reaction is represented by the following equation:

$$C_3H_4(NO_2)_4 \rightarrow 3CO_2 + 2H_2O + 2N_2$$

The 8 atoms of oxygen combine with 3 atoms of carbon and 4 atoms of hydrogen to form 3 molecules of carbon dioxide and 2 molecules of water. Two nitrogen molecules are left over. The disposal of these products of combustion does not present any serious problem particularly since all of them are stable and none of them toxic.

Tetranitropropane has no tendency to stratify or separate out because it is a single chemical compound. In this regard it possesses an important advantage over such fuels as gasoline in which several hydrocarbons are present and the nature of their physical characteristics, such as their volatility, causes them to tend to separate out if they are allowed to stand for considerable periods of time.

Tetranitropropane may exist in six forms, one of which is 1,1,1,2 tetranitropropane and this is the preferred form for purposes of the present invention. It is pointed out, however, that the invention is not limited to this single form but that it is of sufficient scope to include 1,1,1,3 tetranitropropane. The other forms of tetranitropropane are:

1,1,2,2 tetranitropropane
1,1,2,3 tetranitropropane
1,1,3,3 tetranitropropane
1,2,2,3 tetranitropropane The method by which 1,1,1,2 tetranitropropane is made involves a reaction between silver nitroform and 1 bromo, 1 nitroethane. The first step in this process is to produce silver nitroform from nitroform or trinitromethane as it is also known. Twelve grams of nitroform, $(NO_2)_3CH$, are measured out and dissolved in ethyl ether after which moist silver oxide is shaken into the solution. As a result of the reaction expressed by the equation:

$$2(NO_2)_3CH + Ag_2O \rightarrow 2C(NO_2)_3Ag + H_2O$$

silver nitroform and water are formed and are present in solution in the ether. The silver nitroform thus prepared may be separated from the excess of silver oxide by decantation. On evaporation of the ether the silver nitroform solution remains; the water may be removed in vacuo and the silver nitroform crystallized out. There will be approximately 59 grams of the latter, identified by the formula $C(NO_2)_3Ag$.

The preparation of 1 bromo, 1 nitroethane is accomplished by adding to one mole (75 grams) of nitroethane a sufficient quantity of an aqueous solution (about 20%) of sodium hydroxide completely to dissolve the nitroethane. The alkaline solution of the sodium salt of nitroethane thus formed is cooled and then while being vigorously stirred a mole (159.83 grams) of bromine is added. The bromo-nitro compound separates out as an oil which on purification by vacuum distillation will boil at approximately 140° C. The formula for bromo nitro ethane is $$C_2H_4(NO_2)Br$$

and for 1 bromo, 1 nitroethane is:

$$\underset{Br}{\underset{|}{\overset{NO_2}{\overset{|}{CH}}}}-CH_3$$

The silver nitroform and 1 bromo, 1 nitroethane are combined to produce 1,1,1,2 tetranitropropane. This is done by dissolving in ethyl ether 39 grams of the silver nitroform which is then reacted under reflux with 24.6 grams of 1 bromo, 1 nitroethane according to the equation:

$$C(NO_2)_3Ag + C_2H_4(NO_2)Br \rightarrow AgBr + C_3H_4(NO_2)_4$$

The product formed is 1,1,1,2 tetranitropropane with the formula:

$$NO_2-\underset{\underset{NO_2}{|}}{\overset{\overset{NO_2}{|}}{C}}-\overset{\overset{NO_2}{|}}{CH}-CH_3$$

Tetranitropropane is a liquid with a specific gravity of approximately 1.6. It boils at a temperature of approximately 235° C. When ignited it acts as a self sufficient compound to break down in accordance with the equation given above into 2 molecules of water, 3 molecules of carbon dioxide and 4 atoms of free nitrogen.

As has been stated above tetranitropropane has six forms, one of which, namely 1,1,1,2 tetranitropropane, has been described above. Another form is 1,1,1,3 tetranitropropane and this is obtained by the reaction of silver nitroform and 1 bromo, 2 nitroethane. The reaction equation is:

$$C(NO_2)_3Ag + BrCH_2-CH_2NO_2 \longrightarrow$$
$$AgBr + NO_2-\underset{\underset{NO_2}{|}}{\overset{\overset{NO_2}{|}}{C}}-CH_2-CH_2NO_2$$

The combination is effected under conditions similar to those set out for the combining of silver nitroform and 1 bromo, 1 nitroethane.

The products of the reaction are silver bromide and 1,1,1,3 tetranitropropane with the formula:

$$NO_2-\underset{\underset{NO_2}{|}}{\overset{\overset{NO_2}{|}}{C}}-CH_2-CH_2(NO_2)$$

In either of the cases given above silver bromide is a waste product. The silver may be reclaimed by reduction with metallic zinc in the presence of a small amount of dilute HCl to give metallic silver.

Tetranitropropane may be ignited by the introduction into it of a high temperature ignitor and once ignited cannot be extinguished except as the supply of the fuel is cut off. For this reason it is of value under conditions where there is no other available oxygen supply or where the fuel is to be burned in the presence of inert gases or even under water. The flame temperature is relatively high (approximately 2800° C.) and for some uses will necessarily be reduced by the use of a coolant. I have found that water may be used as this coolant. Generally the effect of such a coolant is to reduce the flame temperature, the rate of flame propagation and the detonation characteristics of the fuel. A physical coolant, such as water, acts by absorbing heat through volatilization.

If such a coolant is employed with the fuel described herein it is frequently desirable to make a stable emulsion of all of the ingredients. The reason for this is that water is in general not miscible with tetranitropropane and will tend to separate from it. A dispersing agent by which to attain a stable emulsion may be a triethanolamine soap and specifically triethanolamine stearate. The amount of such dispersing agent that is used is dependent upon the amount of water present, but in general will not comprise more than 2 percent by weight of the entire mixture and its amount may be as little as a trace.

The amount of water, or other physical inhibitor, to be employed is dependent upon calculations that may be made by a person skilled in the art to which this invention pertains. The calculation is based on the number of calories to be removed by the water to give to the burning tetranitropropane the combustion characteristics desired and take up enough of the heat of reaction to reduce the flame temperature to the desired point. Generally the amount of water will be sufficient to give a flame temperature that may be handled in presently known materials that are relatively economical to use. The percentage of water may vary under different conditions from a trace to 70 percent by weight although in most uses now contemplated this percentage will vary from 25 to 70 percent by weight.

A self-sufficient fuel such as the tetranitropropane of this invention is of particular use with various types of prime movers and particularly gas turbines. With such a fuel no compressor is required to compress a large volume of air to provide the requisite oxygen for combustion of the fuel. In the past such compressors have required a considerable power input with a resultant decrease in the over all efficiency of the turbine. The fact that the compressor may be eliminated if a gas turbine is operated with the present fuel is of particular value in the adaptation of gas turbines as a source of power to drive aircraft. Thus there is no necessity for relying on the supply of air from the surrounding atmosphere since the present fuel in itself contains all of the necessary materials required for combustion. The fuel is equally useful in torpedoes, submarines and like underwater craft.

Although the present invention is of particular application to the uses identified above it will be apparent that it may be put to a variety of other useful purposes. Essentially it is of value wherever it is desired to employ a fuel and the oxygen for its combustion in self-sufficient chemical admixture. It is intended that the patent shall cover, by suitable expression in the appended claims, whatever features of patentable novelty that reside in the invention.

We claim:

1. As a new chemical compound, tetranitropropane of the formula $C_3H_4(NO_2)_4$ in which three of the four nitro groups are attached to a single terminal carbon atom.
2. 1,1,1,2 tetranitropropane.
3. 1,1,1,3 tetranitropropane.

JOHN A. HANNUM.
MORRIS FRUMIN.

REFERENCES CITED

The following references are of record in the file of this patent:

UNITED STATES PATENTS

| Number | Name | Date |
|---|---|---|
| 914,624 | Winand | Mar. 9, 1909 |
| 2,152,196 | Kokatnur | Mar. 28, 1939 |
| 2,469,396 | McCracken et al. | May 10, 1949 |

OTHER REFERENCES

Will: "Ber. deut. Chem.," vol. 47 (1914), page 963.

Hunter: "J. Chem. Soc." (London), vol. 125 (1924), page 1483.